(12) United States Patent  
McCarthy et al.

(10) Patent No.: US 9,221,399 B2
(45) Date of Patent: *Dec. 29, 2015

(54) AUTOMOTIVE COMMUNICATION SYSTEM

(71) Applicant: Donnelly Corporation, Holland, MI (US)

(72) Inventors: Kevin C. McCarthy, Tucson, AZ (US); Niall R. Lynam, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/535,742

(22) Filed: Nov. 7, 2014

(65) Prior Publication Data

US 2015/0061900 A1 Mar. 5, 2015

Related U.S. Application Data

(63) Continuation of application No. 14/015,444, filed on Aug. 30, 2013, now Pat. No. 8,884,788, which is a continuation of application No. 13/050,133, filed on Mar. 17, 2011, now Pat. No. 8,252,703, which is a (Continued)

(51) Int. Cl.
*G08G 1/123* (2006.01)
*B60R 1/12* (2006.01)

(Continued)

(52) U.S. Cl.
CPC ... *B60R 1/12* (2013.01); *B60R 1/04* (2013.01); *G01C 21/00* (2013.01); *G01C 21/26* (2013.01); *G01C 21/36* (2013.01); *G01C 21/3608* (2013.01); *G01C 21/3629* (2013.01); *G01C 21/3688* (2013.01); *G06Q 20/32* (2013.01);

(Continued)

(58) Field of Classification Search
CPC ............. H04M 1/72572; H04M 2250/74; H04N 7/183
USPC .............. 340/995.1, 995.12, 995.17, 995.19, 340/995.2, 995.24, 995.25, 988; 701/200, 701/208
See application file for complete search history.

(56) References Cited

U.S. PATENT DOCUMENTS 1,096,452 A 5/1914 Perrin
1,563,258 A 11/1925 Cunningham (Continued)

FOREIGN PATENT DOCUMENTS

AU A-40317/95 2/1995
CN 1189224 7/1998

(Continued)

*Primary Examiner* — Toan N Pham
(74) *Attorney, Agent, or Firm* — Gardner, Linn, Burkhart & Flory, LLP

(57) ABSTRACT

An automotive communication system for a vehicle includes a global positioning system operable to determine a geographical location and a multi-pixel reconfigurable display device disposed at an interior portion of the vehicle. Data is wirelessly communicated to and is received by electronic circuitry of the vehicle and the data is at least in part customized to the geographic location of the vehicle as determined by the global positioning system. Information that is derived at least in part from the data is displayed by the display device and is viewable by a driver of the vehicle. A user input for the wireless communication is operable within the interior cabin of the vehicle. The automotive communication system includes voice input. The data is wirelessly communicated to the vehicle from a data provider located external of and remote from the vehicle.

20 Claims, 3 Drawing Sheets

Related U.S. Application Data continuation of application No. 12/551,849, filed on Sep. 1, 2009, now Pat. No. 7,916,043, which is a continuation of application No. 11/935,795, filed on Nov. 6, 2007, now Pat. No. 7,583,204, which is a continuation of application No. 11/053,436, filed on Feb. 8, 2005, now Pat. No. 7,382,289, which is a continuation of application No. 10/777,812, filed on Feb. 12, 2004, now Pat. No. 6,909,361, which is a continuation of application No. 09/839,678, filed on Apr. 20, 2001, now Pat. No. 6,693,517, said application No. 10/777,812 is a continuation-in-part of application No. 10/365,794, filed on Feb. 13, 2003, now Pat. No. 6,832,719, which is a continuation of application No. 09/687,778, filed on Oct. 13, 2000, now Pat. No. 6,547,133, which is a continuation of application No. 09/057,428, filed on Apr. 8, 1998, now Pat. No. 6,158,655, said application No. 10/777,812 is a continuation-in-part of application No. 10/755,627, filed on Jan. 12, 2004, now Pat. No. 7,158,881, which is a continuation of application No. 10/287,178, filed on Nov. 4, 2002, now Pat. No. 6,678,614, which is a continuation of application No. 09/799,414, filed on Mar. 5, 2001, now Pat. No. 6,477,464, said application No. 13/050,133 is a continuation-in-part of application No. 12/536,930, filed on Aug. 6, 2009, now Pat. No. 8,044,776, which is a continuation of application No. 12/052,341, filed on Mar. 20, 2008, now Pat. No. 7,579,940, which is a continuation of application No. 11/625,374, filed on Jan. 22, 2007, now Pat. No. 7,579,939, which is a continuation of application No. 10/755,915, filed on Jan. 13, 2004, now Pat. No. 7,446,650, which is a continuation of application No. 09/793,002, filed on Feb. 26, 2001, now Pat. No. 6,690,268.

(60) Provisional application No. 60/199,676, filed on Apr. 21, 2000, provisional application No. 60/187,960, filed on Mar. 9, 2000, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000.

(51) Int. Cl.
| | | |
|---|---|---|
| *G01C 21/36* | (2006.01) | |
| *G06Q 20/32* | (2012.01) | |
| *G06Q 20/34* | (2012.01) | |
| *G07F 7/08* | (2006.01) | |
| *G07F 7/10* | (2006.01) | |
| *B60R 1/04* | (2006.01) | |
| *G01C 21/00* | (2006.01) | |
| *G01C 21/26* | (2006.01) | |
| *G01S 19/14* | (2010.01) | |

(52) U.S. Cl.
CPC ............ *G06Q 20/327* (2013.01); *G06Q 20/341* (2013.01); *G07F 7/0886* (2013.01); *G07F 7/1008* (2013.01); *B60R 2001/1284* (2013.01); *G01S 19/14* (2013.01)

(56) References Cited

U.S. PATENT DOCUMENTS

| | | |
|---|---|---|
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,648,229 A | 3/1972 | Burrows et al. |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,841,732 A | 10/1974 | Marks |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |

(56) References Cited

U.S. PATENT DOCUMENTS

| | | |
|---|---|---|
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| 4,297,401 A | 10/1981 | Chern et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,447,808 A | 5/1984 | Marcus |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,664,479 A | 5/1987 | Hiroshi |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,758,040 A | 7/1988 | Kingsley et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,774 A | 12/1988 | Koch et al. |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,989,956 A | 2/1991 | Wu et al. |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jenkins |
| 5,012,077 A | 4/1991 | Takano |
| 5,014,167 A | 5/1991 | Roberts |

(56) References Cited

U.S. PATENT DOCUMENTS

| | | |
|---|---|---|
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,072,380 A | 12/1991 | Randelman et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinama et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,310,999 A | 5/1994 | Claus et al. |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,398,134 A | 3/1995 | Ikegaya |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,426,723 A | 6/1995 | Horsley |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,473,702 A | 12/1995 | Yoshida et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |

(56) References Cited

U.S. PATENT DOCUMENTS

| | | |
|---|---|---|
| 5,485,520 A | 1/1996 | Chaum et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,517,853 A | 5/1996 | Chamussy |
| 5,519,621 A | 5/1996 | Wortham |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,590,038 A | 12/1996 | Pitroda |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,621,571 A | 4/1997 | Bantli et al. |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,663,548 A | 9/1997 | Hayashi et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,694,474 A | 12/1997 | Ngo et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,710,702 A | 1/1998 | Hayashi et al. |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| 5,754,665 A | 5/1998 | Hosoi |
| D394,833 S | 6/1998 | Muth |
| 5,760,242 A | 6/1998 | Igrashi et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |

(56) References Cited

U.S. PATENT DOCUMENTS

| | | |
|---|---|---|
| 5,793,027 A | 8/1998 | Baik et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,872,513 A | 2/1999 | Fitzgibbon et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,917,944 A | 6/1999 | Wakisaka et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,931,555 A | 8/1999 | Akahane et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,940,503 A | 8/1999 | Palett et al. |
| 5,942,895 A | 8/1999 | Popovic et al. |
| 5,947,586 A | 9/1999 | Weber |
| 5,949,331 A | 9/1999 | Schofield et al. |
| 5,949,345 A | 9/1999 | Beckert et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,962,833 A | 10/1999 | Hayashi |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,975,715 A | 11/1999 | Bauder |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,995,898 A | 11/1999 | Tuttle |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,011,518 A | 1/2000 | Yamagishi et al. |
| 6,016,035 A | 1/2000 | Eberspächer et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |
| 6,023,229 A | 2/2000 | Bugno et al. |
| 6,025,872 A | 2/2000 | Ozaki et al. |
| 6,028,537 A | 2/2000 | Suman et al. |
| 6,037,689 A | 3/2000 | Bingle et al. |
| 6,040,939 A | 3/2000 | Demiryont et al. |
| 6,042,253 A | 3/2000 | Fant, Jr. et al. |
| 6,042,934 A | 3/2000 | Guiselin et al. |
| 6,045,243 A | 4/2000 | Muth et al. |
| 6,045,643 A | 4/2000 | Byker et al. |
| 6,046,766 A | 4/2000 | Sakata |
| 6,046,837 A | 4/2000 | Yamamoto |
| 6,049,171 A | 4/2000 | Stam et al. |
| D425,466 S | 5/2000 | Todd et al. |
| 6,060,989 A | 5/2000 | Gehlot |
| 6,061,002 A | 5/2000 | Weber et al. |
| 6,062,920 A | 5/2000 | Jordan et al. |
| 6,064,508 A | 5/2000 | Forgette et al. |
| 6,065,840 A | 5/2000 | Caskey et al. |
| 6,066,920 A | 5/2000 | Torihara et al. |
| 6,067,111 A | 5/2000 | Hahn et al. |
| 6,067,500 A | 5/2000 | Morimoto et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,072,391 A | 6/2000 | Suzukie et al. |
| 6,074,077 A | 6/2000 | Pastrick et al. |
| 6,074,777 A | 6/2000 | Reimers et al. |
| 6,076,948 A | 6/2000 | Bukosky et al. |
| 6,078,355 A | 6/2000 | Zengel |
| 6,078,865 A | 6/2000 | Koyanagi |
| D428,372 S | 7/2000 | Todd et al. |
| D428,373 S | 7/2000 | Todd et al. |
| 6,082,881 A | 7/2000 | Hicks |
| 6,084,700 A | 7/2000 | Knapp et al. |

(56) References Cited

U.S. PATENT DOCUMENTS

| | | |
|---|---|---|
| 6,086,131 A | 7/2000 | Bingle et al. |
| 6,086,229 A | 7/2000 | Pastrick |
| 6,087,012 A | 7/2000 | Varaprasad et al. |
| 6,087,953 A | 7/2000 | DeLine et al. |
| 6,091,343 A | 7/2000 | Dykema et al. |
| 6,093,976 A | 7/2000 | Kramer et al. |
| 6,094,618 A | 7/2000 | Harada |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,097,316 A | 8/2000 | Liaw et al. |
| 6,098,879 A | 8/2000 | Terranova |
| 6,099,131 A | 8/2000 | Fletcher et al. |
| 6,099,155 A | 8/2000 | Pastrick et al. |
| 6,102,546 A | 8/2000 | Carter |
| 6,102,559 A | 8/2000 | Nold et al. |
| 6,104,552 A | 8/2000 | Thau et al. |
| 6,106,121 A | 8/2000 | Buckley et al. |
| 6,111,498 A | 8/2000 | Jobes, I et al. |
| 6,111,683 A | 8/2000 | Cammenga et al. |
| 6,111,684 A | 8/2000 | Forgette et al. |
| 6,111,685 A | 8/2000 | Tench et al. |
| 6,111,696 A | 8/2000 | Allen et al. |
| 6,115,086 A | 9/2000 | Rosen |
| 6,115,651 A | 9/2000 | Cruz |
| 6,116,743 A | 9/2000 | Hoek |
| 6,118,219 A | 9/2000 | Okigami et al. |
| 6,122,597 A | 9/2000 | Saneyoshi et al. |
| 6,122,921 A | 9/2000 | Brezoczky et al. |
| 6,124,647 A | 9/2000 | Marcus et al. |
| 6,124,886 A | 9/2000 | DeLine et al. |
| 6,127,919 A | 10/2000 | Wylin |
| 6,127,945 A | 10/2000 | Mura-Smith |
| 6,128,576 A | 10/2000 | Nishimoto et al. |
| 6,130,421 A | 10/2000 | Bechtel et al. |
| 6,130,448 A | 10/2000 | Bauer et al. |
| 6,132,072 A | 10/2000 | Turnbull et al. |
| 6,137,620 A | 10/2000 | Guarr et al. |
| 6,139,171 A | 10/2000 | Waldmann |
| 6,139,172 A | 10/2000 | Bos et al. |
| 6,140,933 A | 10/2000 | Bugno et al. |
| 6,142,656 A | 11/2000 | Kurth |
| 6,146,003 A | 11/2000 | Thau |
| 6,147,934 A | 11/2000 | Arikawa et al. |
| 6,148,261 A | 11/2000 | Obradovich et al. |
| 6,149,287 A | 11/2000 | Pastrick et al. |
| 6,150,014 A | 11/2000 | Chu et al. |
| 6,151,065 A | 11/2000 | Steed et al. |
| 6,151,539 A | 11/2000 | Bergholz et al. |
| 6,152,551 A | 11/2000 | Annas |
| 6,152,590 A | 11/2000 | Fürst et al. |
| 6,154,149 A | 11/2000 | Tyckowski et al. |
| 6,154,306 A | 11/2000 | Varaprasad et al. |
| 6,157,294 A | 12/2000 | Urai et al. |
| 6,157,418 A | 12/2000 | Rosen |
| 6,157,424 A | 12/2000 | Eichenlaub |
| 6,157,480 A | 12/2000 | Anderson et al. |
| 6,158,655 A | 12/2000 | DeVries, Jr. et al. |
| 6,161,071 A | 12/2000 | Shuman et al. |
| 6,161,865 A | 12/2000 | Rose et al. |
| 6,164,564 A | 12/2000 | Franco et al. |
| 6,166,625 A | 12/2000 | Teowee et al. |
| 6,166,629 A | 12/2000 | Hamma et al. |
| 6,166,698 A | 12/2000 | Turnbull et al. |
| 6,166,834 A | 12/2000 | Taketomi et al. |
| 6,166,847 A | 12/2000 | Tench et al. |
| 6,166,848 A | 12/2000 | Cammenga et al. |
| 6,167,255 A | 12/2000 | Kennedy, III et al. |
| 6,167,755 B1 | 1/2001 | Damson et al. |
| 6,169,955 B1 | 1/2001 | Fultz |
| 6,170,956 B1 | 1/2001 | Rumsey et al. |
| 6,172,600 B1 | 1/2001 | Kakinama et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,379 B1 | 2/2001 | Tonar et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 | 3/2001 | Walker et al. |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,460 B1 | 4/2001 | DeLine et al. |
| 6,222,689 B1 | 4/2001 | Higuchi et al. |
| 6,227,689 B1 | 5/2001 | Miller |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 | 6/2001 | DeLine et al. |
| 6,244,716 B1 | 6/2001 | Steenwyk et al. |
| 6,245,262 B1 | 6/2001 | Varaprasad et al. |
| 6,246,933 B1 | 6/2001 | Bague |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,831 B1 | 7/2001 | Bauer et al. |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,275,231 B1 | 8/2001 | Obradovich |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |

(56) References Cited

U.S. PATENT DOCUMENTS

| | | |
|---|---|---|
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,327,925 B1 | 12/2001 | Gombert et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,369,701 B1 | 4/2002 | Yoshida et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,456,438 B1 | 9/2002 | Lee et al. |
| 6,462,795 B1 | 10/2002 | Clarke |
| 6,463,369 B2 | 10/2002 | Sadano et al. |
| 6,465,963 B1 | 10/2002 | Turnbull et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,476,855 B1 | 11/2002 | Yamamoto |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B1 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,378 B2 | 2/2003 | Drummond et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chutorash |
| 6,543,163 B1 | 4/2003 | Ginsberg |
| 6,545,598 B1 | 4/2003 | de Villeroche |
| 6,547,133 B1 | 4/2003 | DeVries, Jr. et al. |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,552,653 B2 | 4/2003 | Nakaho et al. |
| 6,553,308 B1 | 4/2003 | Uhlmann et al. |
| 6,559,761 B1 | 5/2003 | Miller et al. |
| 6,559,902 B1 | 5/2003 | Kusuda et al. |

(56) References Cited

U.S. PATENT DOCUMENTS

| | | |
|---|---|---|
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,567,708 B1 | 5/2003 | Bechtel et al. |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takashashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,288 B2 | 9/2003 | Duroux et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | DeLine et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,667,726 B1 | 12/2003 | Damiani et al. |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,935 B2 | 12/2003 | Yeon et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsberg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,704,434 B1 | 3/2004 | Sakoh et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,742,905 B2 | 6/2004 | Suyama et al. |
| 6,744,353 B2 | 6/2004 | Sjönell |
| 6,746,127 B2 | 6/2004 | Suyama |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |

(56) References Cited

U.S. PATENT DOCUMENTS

| | | |
|---|---|---|
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,880,750 B2 | 4/2005 | Pentel |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,361 B2 | 6/2005 | McCarthy et al. |
| 6,909,486 B2 | 6/2005 | Wang et al. |
| 6,910,779 B2 | 6/2005 | Abel et al. |
| 6,912,001 B2 | 6/2005 | Okamoto et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,917,404 B2 | 7/2005 | Baek |
| 6,918,674 B2 | 7/2005 | Drummond et al. |
| 6,922,902 B2 | 8/2005 | Schierbeek et al. |
| 6,923,080 B1 | 8/2005 | Dobler et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,954,300 B2 | 10/2005 | Varaprasad et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |
| 6,967,569 B2 | 11/2005 | Weber et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wang |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |
| 7,063,893 B2 | 6/2006 | Hoffman |
| 7,064,882 B2 | 6/2006 | Tonar et al. |
| 7,068,289 B2 | 6/2006 | Satoh et al. |
| 7,074,486 B2 | 7/2006 | Boire et al. |
| 7,081,810 B2 | 7/2006 | Henderson et al. |
| 7,085,633 B2 | 8/2006 | Nishira et al. |
| 7,092,052 B2 | 8/2006 | Okamoto et al. |
| 7,095,432 B2 | 8/2006 | Nakayama et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,110,021 B2 | 9/2006 | Nobori et al. |
| 7,114,554 B2 | 10/2006 | Bergman et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,150,552 B2 | 12/2006 | Weidel |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,202,987 B2 | 4/2007 | Varaprasad et al. |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,221,365 B1 | 5/2007 | Lévesque et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,232,594 B2 | 6/2007 | Miroshin et al. |
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,283 B2 | 7/2007 | Takagi et al. |
| 7,248,305 B2 | 7/2007 | Ootsuta et al. |
| 7,249,860 B2 | 7/2007 | Kulas et al. |
| 7,251,079 B2 | 7/2007 | Capaldo et al. |

(56) References Cited

U.S. PATENT DOCUMENTS

| | | |
|---|---|---|
| 7,253,723 B2 | 8/2007 | Lindahl et al. |
| 7,255,451 B2 | 8/2007 | McCabe et al. |
| 7,255,465 B2 | 8/2007 | DeLine et al. |
| 7,259,036 B2 | 8/2007 | Borland et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,292,918 B2 | 11/2007 | Silvester |
| 7,300,183 B2 | 11/2007 | Kiyomoto et al. |
| 7,302,344 B2 | 11/2007 | Olney et al. |
| 7,304,661 B2 | 12/2007 | Ishikura |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,172 B2 | 1/2008 | Yamazaki et al. |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,382,289 B2 | 6/2008 | McCarthy et al. |
| 7,389,171 B2 | 6/2008 | Rupp |
| 7,391,563 B2 | 6/2008 | McCabe et al. |
| 7,396,147 B2 | 7/2008 | Munro |
| 7,411,637 B2 | 8/2008 | Weiss |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Schofield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,047 B2 | 3/2009 | Yoshimura |
| 7,505,188 B2 | 3/2009 | Niiyama |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,583,204 B2 | 9/2009 | McCarthy et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |

(56) References Cited

U.S. PATENT DOCUMENTS

| | | |
|---|---|---|
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,911,547 B2 | 3/2011 | Brott et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bernas et al. |
| 8,031,225 B2 | 10/2011 | Watanabe et al. |
| 8,040,376 B2 | 10/2011 | Yamada et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | Deline et al. |
| 8,072,318 B2 | 12/2011 | Lynam et al. |
| 8,083,386 B2 | 12/2011 | Lynam |
| 8,094,002 B2 | 1/2012 | Schofield et al. |
| 8,095,260 B1 | 1/2012 | Schofield et al. |
| 8,095,310 B2 | 1/2012 | Taylor et al. |
| 8,100,568 B2 | 1/2012 | Deline et al. |
| 8,106,347 B2 | 1/2012 | Drummond et al. |
| 8,121,787 B2 | 2/2012 | Taylor et al. |
| 8,134,117 B2 | 3/2012 | Heslin et al. |
| 8,144,033 B2 | 3/2012 | Chinomi et al. |
| 8,154,418 B2 | 4/2012 | Hook et al. |
| 8,162,493 B2 | 4/2012 | Skiver et al. |
| 8,164,817 B2 | 4/2012 | Varaprasad et al. |
| 8,169,307 B2 | 5/2012 | Nakamura et al. |
| 8,170,748 B1 | 5/2012 | Schofield et al. |
| 8,177,376 B2 | 5/2012 | Weller et al. |
| 8,179,236 B2 | 5/2012 | Weller et al. |
| 8,179,437 B2 | 5/2012 | Schofield et al. |
| 8,179,586 B2 | 5/2012 | Schofield et al. |
| 8,194,132 B2 | 6/2012 | Dayan et al. |
| 8,194,133 B2 | 6/2012 | De Wind et al. |
| 8,217,887 B2 | 7/2012 | Sangam et al. |
| 8,228,588 B2 | 7/2012 | McCabe et al. |
| 8,237,909 B2 | 8/2012 | Ostreko et al. |
| 8,254,011 B2 | 8/2012 | Baur et al. |
| 8,267,559 B2 | 9/2012 | DeLine et al. |
| 8,271,187 B2 | 9/2012 | Taylor et al. |
| 8,277,059 B2 | 10/2012 | McCabe et al. |
| 8,282,224 B2 | 10/2012 | Anderson et al. |
| 8,282,226 B2 | 10/2012 | Blank et al. |
| 8,282,253 B2 | 10/2012 | Lynam |
| 8,288,711 B2 | 10/2012 | Heslin et al. |
| 8,294,975 B2 | 10/2012 | Varaprasad et al. |
| 8,304,711 B2 | 11/2012 | Drummond et al. |
| 8,308,325 B2 | 11/2012 | Takayanagi et al. |
| 8,309,907 B2 | 11/2012 | Heslin et al. |
| 8,325,028 B2 | 12/2012 | Schofield et al. |
| 8,335,032 B2 | 12/2012 | McCabe et al. |
| 8,339,526 B2 | 12/2012 | Minikey, Jr. et al. |
| 8,355,853 B2 | 1/2013 | Schofield et al. |
| 8,358,262 B2 | 1/2013 | Degwekar et al. |
| 8,379,289 B2 | 2/2013 | Schofield et al. |
| 8,400,704 B2 | 3/2013 | McCabe et al. |
| 8,427,288 B2 | 4/2013 | Schofield et al. |
| 8,432,600 B2 | 4/2013 | Brown et al. |
| 8,462,204 B2 | 6/2013 | Schofield et al. |
| 8,465,162 B2 | 6/2013 | Weller et al. |
| 8,465,163 B2 | 6/2013 | Blank et al. |
| 8,482,683 B2 | 7/2013 | Hwang et al. |
| 8,506,096 B2 | 8/2013 | McCabe et al. |
| 8,508,383 B2 | 8/2013 | Peterson et al. |
| 8,508,384 B2 | 8/2013 | Uken et al. |
| 8,511,841 B2 | 8/2013 | Varaprasad et al. |
| 8,520,069 B2 | 8/2013 | Haler |
| 8,525,703 B2 | 9/2013 | McCarthy et al. |
| 8,543,330 B2 | 9/2013 | Taylor et al. |
| 8,545,030 B2 | 10/2013 | Anderson et al. |
| 8,559,093 B2 | 10/2013 | Varaprasad et al. |
| 8,577,549 B2 | 11/2013 | Schofield et al. |
| 8,582,052 B2 | 11/2013 | Ockerse |
| 8,884,788 B2 | 11/2014 | McCarthy et al. |
| 2001/0020202 A1 | 9/2001 | Obradovich |
| 2001/0026316 A1 | 10/2001 | Senatore |
| 2001/0035853 A1 | 11/2001 | Hoelen et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0069690 A1 | 4/2003 | Correia et al. |
| 2003/0090568 A1 | 5/2003 | Pico |
| 2003/0090569 A1 | 5/2003 | Poechmueller |
| 2003/0098908 A1 | 5/2003 | Misaiji et al. |
| 2003/0103142 A1 | 6/2003 | Hitomi et al. |
| 2003/0122929 A1 | 7/2003 | Minaudo et al. |
| 2003/0133014 A1 | 7/2003 | Mendoza |
| 2003/0137586 A1 | 7/2003 | Lewellen |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0227546 A1 | 12/2003 | Hilborn et al. |
| 2004/0004541 A1 | 1/2004 | Hong |
| 2004/0027695 A1 | 2/2004 | Lin |
| 2004/0036768 A1 | 2/2004 | Green |
| 2004/0080404 A1 | 4/2004 | White |
| 2004/0239243 A1 | 12/2004 | Roberts et al. |
| 2004/0239849 A1 | 12/2004 | Wang |
| 2005/0018738 A1 | 1/2005 | Duan et al. |
| 2005/0024591 A1 | 2/2005 | Lian et al. |
| 2005/0117095 A1 | 6/2005 | Ma |
| 2005/0168995 A1 | 8/2005 | Kittlemann et al. |

(56) References Cited

U.S. PATENT DOCUMENTS

| | | |
|---|---|---|
| 2005/0237440 A1 | 10/2005 | Sugimura et al. |
| 2005/0270766 A1 | 12/2005 | Kung et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0187378 A1 | 8/2006 | Bong et al. |
| 2006/0279522 A1 | 12/2006 | Kurihara |
| 2007/0064108 A1 | 3/2007 | Haler |
| 2007/0080585 A1 | 4/2007 | Lyu |
| 2007/0086097 A1 | 4/2007 | Motomiya et al. |
| 2007/0183037 A1 | 8/2007 | De Boer et al. |
| 2007/0262732 A1 | 11/2007 | Shen |
| 2008/0042938 A1 | 2/2008 | Cok |
| 2009/0052003 A1 | 2/2009 | Schofield et al. |
| 2009/0096937 A1 | 4/2009 | Bauer et al. |
| 2009/0201137 A1 | 8/2009 | Weller et al. |
| 2009/0258221 A1 | 10/2009 | Diehl et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2011/0166779 A1 | 7/2011 | McCarthy et al. |
| 2011/0273659 A1 | 11/2011 | Sobecki |
| 2012/0050068 A1 | 3/2012 | DeLine et al. |
| 2012/0086808 A1 | 4/2012 | Lynam et al. |
| 2012/0203550 A1 | 8/2012 | Skiver et al. |
| 2012/0236152 A1 | 9/2012 | De Wind et al. |
| 2013/0027952 A1 | 1/2013 | Lynam et al. |
| 2013/0063802 A1 | 3/2013 | Varaprasad et al. |
| 2013/0107563 A1 | 5/2013 | McCabe et al. |
| 2013/0153127 A1 | 6/2013 | Schofield et al. |
| 2013/0229522 A1 | 9/2013 | Schofield et al. |
| 2013/0289915 A1 | 10/2013 | Blank et al. |

FOREIGN PATENT DOCUMENTS

| | | |
|---|---|---|
| DE | 941408 | 4/1956 |
| DE | 944531 | 7/1956 |
| DE | 7323996 | 11/1973 |
| DE | 3248511 | 7/1984 |
| DE | 3301945 | 7/1984 |
| DE | 3605704 | 8/1987 |
| DE | 3614882 | 11/1987 |
| DE | 3720848 | 1/1989 |
| DE | 9306989.8 | 7/1993 |
| DE | 4329983 | 8/1995 |
| DE | 4444443 | 6/1996 |
| DE | 29703084 | 6/1997 |
| DE | 29805142 | 5/1998 |
| DE | 19741896 | 4/1999 |
| DE | 19755008 | 7/1999 |
| DE | 29902344 | 7/1999 |
| DE | 19934999 | 2/2001 |
| DE | 19943355 | 3/2001 |
| DE | 20118868 | 3/2002 |
| DE | 10131459 | 1/2003 |
| EP | 0299509 | 1/1989 |
| EP | 0513476 | 11/1992 |
| EP | 0524766 | 1/1993 |
| EP | 0729864 | 12/1995 |
| EP | 0728618 | 8/1996 |
| EP | 0825477 | 2/1998 |
| EP | 0830985 | 3/1998 |
| EP | 0928723 | 7/1999 |
| EP | 937601 | 8/1999 |
| EP | 0979758 | 2/2000 |
| EP | 1075986 | 2/2001 |
| EP | 1097848 | 5/2001 |
| EP | 1152285 | 11/2001 |
| EP | 1193773 | 3/2002 |
| EP | 1256833 | 11/2002 |
| EP | 0899157 | 10/2004 |
| EP | 1315639 | 2/2006 |
| FR | 1021987 | 2/1953 |
| FR | 1461419 | 12/1966 |
| FR | 2585991 | 2/1987 |
| FR | 2672857 | 8/1992 |
| FR | 2673499 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 | 10/1984 |
| GB | 2161440 | 1/1986 |
| GB | 2192370 | 1/1988 |
| GB | 2222991 | 3/1990 |
| GB | 2255539 | 11/1992 |
| GB | 2351055 | 12/2000 |
| GB | 2362494 | 11/2001 |
| JP | 50-000638 | 1/1975 |
| JP | 52-146988 | 11/1977 |
| JP | 55-039843 | 3/1980 |
| JP | 57-30639 | 2/1982 |
| JP | 57-208530 | 12/1982 |
| JP | 58-020954 | 2/1983 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61-127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 62-131232 | 6/1987 |
| JP | 63-02753 | 1/1988 |
| JP | 63-085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01-130578 | 5/1989 |
| JP | 02-122844 | 10/1990 |
| JP | 03-28947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04-114587 | 4/1992 |
| JP | 04-245886 | 9/1992 |
| JP | 05-080716 | 4/1993 |
| JP | 05-183194 | 7/1993 |
| JP | 05-213113 | 8/1993 |
| JP | 05-257142 | 10/1993 |
| JP | 60-80953 | 3/1994 |
| JP | 61-07035 | 4/1994 |
| JP | 62-27318 | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |

(56) References Cited

FOREIGN PATENT DOCUMENTS

| | | |
|---|---|---|
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-131880 | 5/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| JP | 2008-083657 | 4/2008 |
| KR | 20060038856 | 5/2006 |
| KR | 100663930 | 1/2007 |
| WO | WO 82/02448 | 7/1982 |
| WO | WO 86/06179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO 03/078941 | 9/2003 |

AUTOMOTIVE COMMUNICATION SYSTEM

CROSS-REFERENCE TO RELATED APPLICATIONS

This application is a continuation of U.S. patent application Ser. No. 14/015,444, filed Aug. 30, 2013, now U.S. Pat. No. 8,884,788, which is a continuation of U.S. patent application Ser. No. 13/050,133, filed Mar. 17, 2011, now U.S. Pat. No. 8,525,703, which is a continuation of U.S. patent application Ser. No. 12/551,849, filed Sep. 1, 2009, now U.S. Pat. No. 7,916,043, which is a continuation of U.S. patent application Ser. No. 11/935,795, filed Nov. 6, 2007, now U.S. Pat. No. 7,583,204, which is a continuation of U.S. patent application Ser. No. 11/053,436, filed on Feb. 8, 2005, now U.S. Pat. No. 7,382,289, which is a continuation of U.S. patent application Ser. No. 10/777,812, filed on Feb. 12, 2004, now U.S. Pat. No. 6,909,361, which is a continuation of U.S. patent application Ser. No. 09/839,678, filed on Apr. 20, 2001, now U.S. Pat. No. 6,693,517, which claims priority from U.S. provisional application Ser. No. 60/199,676, filed on Apr. 21, 2000, the disclosures of which are hereby incorporated herein by reference in their entirety; and application Ser. No. 10/777,812 is a continuation-in-part of U.S. patent application Ser. No. 10/365,794, filed on Feb. 13, 2003, now U.S. Pat. No. 6,832,719, which is a continuation of U.S. patent application Ser. No. 09/687,778, filed Oct. 13, 2000, now U.S. Pat. No. 6,547,133, which is a continuation of U.S. patent application Ser. No. 09/057,428, filed Apr. 8, 1998, now U.S. Pat. No. 6,158,655; and application Ser. No. 10/777,812 is a continuation-in-part of U.S. patent application Ser. No. 10/755,627, filed on Jan. 12, 2004, now U.S. Pat. No. 7,158,881, which is a continuation of U.S. patent application Ser. No. 10/287,178, filed on Nov. 4, 2002, now U.S. Pat. No. 6,678,614, which is a continuation of U.S. patent application Ser. No. 09/799,414, filed on Mar. 5, 2001, now U.S. Pat. No. 6,477,464, which claims priority from U.S. provisional patent application Ser. No. 60/187,960, filed on Mar. 9, 2000; and U.S. patent application Ser. No. 13/050,133 is a continuation-in-part of U.S. patent application Ser. No. 12/536,930, filed Aug. 6, 2009, now U.S. Pat. No. 8,044,776, which is a continuation of U.S. patent application Ser. No. 12/052,341, filed Mar. 20, 2008, now U.S. Pat. No. 7,579,940, which is a continuation of U.S. patent application Ser. No. 11/625,374, filed Jan. 22, 2007, now U.S. Pat. No. 7,579,939, which is a continuation of U.S. patent application Ser. No. 10/755,915, filed Jan. 13, 2004, now U.S. Pat. No. 7,446,650, which is a continuation of U.S. application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000.

BACKGROUND OF THE INVENTION

This invention relates to data and information communication within an automobile and particularly to automotive mirror assemblies adapted to communicate wirelessly with other vehicular accessories and/or with personal accessories of occupants of the vehicle.

SUMMARY OF THE INVENTION

A vehicle may have features and/or accessories connected by a variety of wireless links and/or wired links, such as are described in commonly assigned U.S. Pat. No. 6,396,408, which claims priority from U.S. provisional patent application Ser. No. 60/196,577, filed on Mar. 31, 2000, and U.S. Pat. No. 6,294,989, the disclosures of which are hereby incorporated herein by reference. For example, some vehicle features, accessories and functions can be interconnected by and/or can communicate by wire connection, by wireless infrared communication, wireless microwave communication, by wireless RF communication, or by any combination of the above.

As described also in commonly assigned U.S. Pat. No. 6,690,268, which relates to U.S. provisional application Ser. No. 60/263,680, filed on Jan. 23, 2001, U.S. provisional application Ser. No. 60/243,986, filed on Oct. 27, 2000, U.S. provisional application Ser. No. 60/238,483, filed on Oct. 6, 2000, U.S. provisional application Ser. No. 60/237,077, filed on Sep. 30, 2000, U.S. provisional application Ser. No. 60/234,412, filed on Sep. 21, 2000, U.S. provisional application Ser. No. 60/218,336, filed on Jul. 14, 2000, and U.S. provisional patent application Ser. No. 60/186,520, filed on Mar. 2, 2000, and in commonly assigned U.S. Pat. Nos. 6,000,823 and 5,959,367, all of the disclosures of which are hereby incorporated herein by reference, the vehicle and particularly the interior/exterior mirror assembly can host a variety of features and accessories. Also, such features and accessories can be connected via cable elements, such as coaxial cable, a multi-ribbon cable, a multiwire cable, and/or a fiber-optic cable (for communicating by optical method), or can be connected without wires, such as by short range RF wireless communication such as provided by Motorola, Schaumberg, Ill. via their BLUETOOTH protocol or by infrared wireless communication such as provided via the IrDA protocol available from Clarinet System Inc. of San Jose, Calif.

The present invention is particularly suitable for use in a "connected car," i.e., an automobile in two-way communication with a remote party such as by a telematic wireless communication link, and most preferably, connected to an information source such as the WorldWide WEB via the INTERNET. This present invention provides compatibility and interoperability for mobile devices, such as hand-held mobile phones, personal digital assistants (PDA) such as a PalmPilot PDA, hand-held personal identifiers, hand-held remote entry devices, such as a key fob as known in the automotive arts including active and passive entry key fobs, and the like.

Accessories may be provided at the purchase of the vehicle as in-vehicle installed items or may be carried in and out of the vehicle by the user. Such can be provided with ports or interfaces adapted to communicate via the use of a cable or wired communication, but more preferably a wireless communication. For example, a modular phone may be equipped with an RF communication link operating under a short-range wireless communication protocol, such as BLUETOOTH available from Motorola of Schaumberg, Ill., that communicates with the vehicle wirelessly so that, for example, telephone communication can be conducted via the audio system of the vehicle while the occupant possessing the BLUETOOTH-equipped phone is using the phone. Likewise, a phone or other mobile device can be equipped with an infrared (IR) communication interface/port such as an IrDA port than can provide wireless infrared connectivity.

A vehicle mirror-based wireless communication system, according to an aspect of the invention, includes an interior rearview mirror assembly including an interior mirror reflective element, a housing for the reflective element, and a mirror-mounted communication device. The mirror-mounted communication device includes a communication data port for short-range communication with a mobile device that is a personal accessory of an occupant of the vehicle. The communication device further includes a telecommunication link from the vehicle to an external provider of information or service. In this manner, the communication device provides connectivity between a low-power mobile device and a provider of information or service separated from the vehicle.

A vehicle mirror-based wireless communication system, according to another aspect of the invention, includes an interior rearview mirror assembly including an interior mirror reflective element and a housing for the reflective element. A remote telematic server is provided that is remote from the vehicle. A vehicular dynamic interactive communication system is provided at the rearview mirror assembly. The communication system includes a Global Positioning System (GPS) for determining a geographic location of the vehicle and a first communication link with the remote telematic server. The mirror-based wireless communication system further includes at least one service provider and a second communication link between the at least one service provider and the telematic server. In this manner, the communication system communicates identification data to the telematic server pertaining to either the location, identity and/or direction heading of the vehicle. The at least one service provider provides assistance data to the vehicle via the first and second communication links. The assistance data is customized to the location identity and/or direction heading of the vehicle.

These and other objects, advantages and features of this invention will become apparent upon review of the following specification in conjunction with the drawings.

DESCRIPTION OF THE PREFERRED EMBODIMENT

Figure 1:
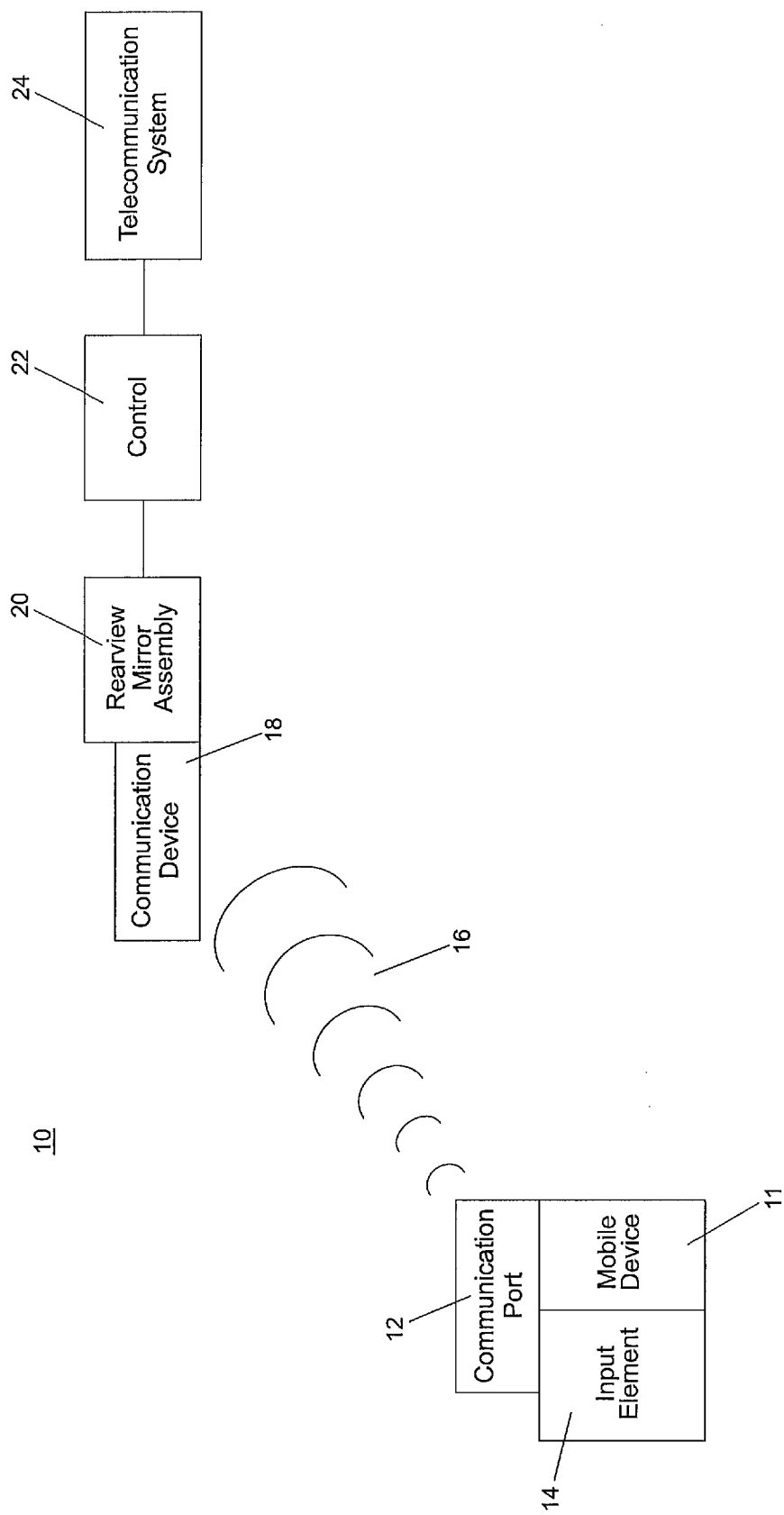
FIG. 1 is an electrical block diagram of a vehicle mirror-based wireless communication system, according to the invention.

In order for mobile devices to be used within the interior cabin of a vehicle, such as an automobile, the vehicle must be equipped with at least one complementary interface/port capable of wireless communication with the mobile device within the vehicle cabin, or when approaching the vehicle from the exterior. Where wireless infrared connectivity is used, it is preferred that line-of-sight communication be possible between the mobile device and the interface/port of the vehicle that serves as the interface and exchange point for data between the mobile device and the vehicle electronics system/accessories. In this regard, placement of an IR data port at the interior rearview mirror assembly (such as at or in the case/bezel of the assembly, or attached to the mirror assembly support about which the casing housing is adjustable, or at or in a pod attached to the attachment mount of the interior mirror assembly to the vehicle, such as to a mirror mounting button on a windshield as are known in the mirror arts) has the advantage of being high mounted and central, and so accessible to all vehicle occupants including those in both the front seats and in rear seats.

The interior rearview mirror of the vehicle (and optionally an exterior side view mirror of the vehicle) is preferably equipped with at least one infrared communication port such as an IrDA (Infrared Data Port) such as the devices available from by Clarinet Systems Inc., San Jose, Calif. for wireless connectivity to other IrDA devices such as the Personal Digital Assistants (PDA) like the Palm Pilot Palm III, IIIx, V, VII, Glenarye pager, Motorola 2000X Pagewriter, and similar devices and cellular phones equipped with IrDA ports such as the Nokia 6210, Windows CE devices, laptop computers, and similar mobile devices having wireless communication capabilities to paging, cellular, or satellite systems. Also, by connecting a mobile device to the vehicle via a vehicle-mounted, preferably mirror-mounted, wireless connectivity interface/port, a low-feature and/or low-power mobile device can be linked to the vehicle, and the vehicle (including its on-board computer) can serve as the modem/communication port/computer for the mobile device, thus greatly expanding the capability of the mobile device. This enables wireless connectivity of devices that originally could not act as a wireless modem.

Also, mobile devices typically have restricted display capabilities. By connecting wirelessly to the vehicle and to the vehicle's electronics (such as a vehicle computer), the greater display capability and/or greater computing power of the vehicle (such as a vehicle video display, preferably mirror-mounted, such as disclosed in commonly assigned U.S. Pat. No. 6,690,268, which relates to U.S. provisional application Ser. No. 60/263,680, filed on Jan. 23, 2001, U.S. provisional application Ser. No. 60/243,986, filed on Oct. 27, 2000, U.S. provisional application Ser. No. 60/238,483, filed on Oct. 6, 2000, U.S. provisional application Ser. No. 60/237,077, filed on Sep. 30, 2000, U.S. provisional application Ser. No. 60/234,412, filed on Sep. 21, 2000, U.S. provisional application Ser. No. 60/218,336, filed on Jul. 14, 2000, and U.S. provisional patent application Ser. No. 60/186,520, filed Mar. 2, 2000, the disclosures of which are hereby incorporated herein by reference), can be accessed and used by the mobile device.

A separate display is located behind the mirror reflector. In such a configuration where a display element is behind the mirror reflector, the reflective mirror coating of the mirror reflective element can be locally at least partially removed at the location of the display element disposed behind the mirror element. Optionally, where all the reflective mirror coating is removed, a semitransparent but significantly reflecting coating or series of coatings (such as a thin metal film coating or a multilayer of coatings, including a thin metal coating of silver, aluminum, rhodium (or their alloys), or the like, or a dichroic coating or coating stack, can be used that substantially masks the display element from driver notice until the display element is powered to display information, such as disclosed in U.S. Pat. Nos. 5,668,663 and 5,724,187, which are incorporated by reference in their entireties. Such has been described as "display on demand" in the art. Such display can include a "display on demand" such as disclosed in U.S. Pat. Nos. 5,668,663 and 5,724,187 noted above. In this regard, it is preferable that the display be a light-emitting display, such as a fluorescent display, a vacuum fluorescent display, a field emission display, an electroluminescent display, a fluorescent display, a plasma display, or a light-emitting diode display, such as an organic or inorganic light-emitting diode display. Alternatively, the reflective element may comprise a substantially reflecting, significantly light-transmitting reflective element, such as disclosed in U.S. Pat. Nos. 5,668,663 and 5,724,187 noted above. An example, such as a semitransparent reflector, would be a third surface reflector coated on the third surface of an electrochromic mirror element, as known in the electrochromic mirror art, consisting of a thin metal coating (such as of silver, silver alloy, aluminum, aluminum alloy) that is significantly reflecting of at least 60%, preferably at least 70% and most preferably at least 75% but also significantly transmitting in the range of between 5% to 30%, preferably in the range of between 10% and 25% and most preferably in the range of between 15% and 20%. Preferably, the thin metal coating is overcoated with a transparent conductor such as indium tin oxide when contacting an electrochromic medium (preferably an electrochromic solid polymer film) when serving as a combined third surface reflector/conductor layer in an electrochromic laminate cell construction. For further details of suitable reflective elements with portions of the reflective mirror coating adapted to permit light to transmit through the reflective element or of a highly reflecting/significantly transflective reflective element, reference is made to U.S. Pat. Nos. 5,668, 663 and 5,724,187.

This access can be facilitated via protocols such as the Wireless Application Protocol (WAP) for mobile devices and can be networked via sub-networks of the WorldWide Web by systems providers such as JP Systems Inc. of Dallas, Tex. Such networks are designed for mobile devices and include client applications, gateways, and backend servers integrating with open standards, such as WAP. The server compresses and optimizes data so that it can be sent to wireless devices in a format that is best suited to those devices. Typically this data is displayed in a few lines of text, preferably a scrolling line of text data, to suit such mobile interactive transceivers. When connected within a vehicle, preferably such data is displayed at the interior rearview mirror.

As described in commonly assigned U.S. Pat. No. 6,477, 464, which claims priority from U.S. provisional patent application Ser. No. 60/187,960 filed on Mar. 9, 2000, and U.S. Pat. No. 6,553,308, which claims priority from U.S. provisional application Ser. No. 60/131,593 filed on Apr. 29, 1999, the disclosures of which are hereby incorporated herein by reference, provision of a display and particularly a scrolling text display at the interior rear view assembly of the vehicle (and/or the exterior rear view mirror assembly) has many advantages including ease of readability and recognition by the driver of the vehicle.

The interfacing of a mobile accessory to the vehicle via a wireless link, preferably a wireless IR link, can be further enhanced by linking to the vehicle's GPS system. The GPS system can provide location/directional information to the driver. This can facilitate a PUSH communication protocol whereby information and messages are automatically transmitted to the driver. Alternatively, or in addition, a PULL communication protocol can be used whereby the driver selects information at his/her request only. This optionally can be a user-defined option. For example, assume the vehicle equipped with the present invention is approaching a service/convenience/food supplier such as a Starbucks coffee location or a service station. The in-vehicle GPS system can alert the WAP hardware located either in the vehicle or, through the IrDA port, on the handheld device and offer a discount such as a $0.25 electronic coupon if the driver decides to stop for a particular purchase at that store. The vehicle location is wirelessly transmitted from the vehicle to a system such as ONSTAR™ available from General Motors or a similar system. The location of the vehicle is then provided to a service location proximate to the location of the vehicle or in the direction of travel of the vehicle. Such service provider(s) can then communicate wirelessly back to the vehicle specific information/service offers/discount information/advertisements, and the driver or other occupants of the vehicle can make decisions based on this received information and/or can specifically communicate with such service provider(s).

Also, INTERNET and/or telemetry sites and services can be provided at a low cost or free to the driver, and with the compensation to the remote service provider be via advertisements received at the vehicle and displayed to the driver. By linking via the GPS system of the vehicle, such advertisements can be customized to suit the particular geographic location where the vehicle is located. Also, customized entertainment and/or information can be provided by wireless communication to the vehicle, such as from a digital satellite radio station, and with content, such as advertisements, local news broadcasts, weather data, traffic data, and the like, customized to the particular location of the vehicle via dynamic interactive communication that communicates GPS data concerning the vehicle location and heading, generated by an in-vehicle GPS system, from the vehicle to a remote receiver (such as a web site, telemetry service or media station) via wireless transmission and receiving of data to and from the vehicle, and, preferably, via an IrDA-port, to a mobile device such as a personal cell phone or PDA in the vehicle.

Another embodiment of the invention is the placement of mobile device communication ports such IrDA ports in the vehicle cabins of automobiles in a rental car fleet. Preferably, the communication port, such as an IrDA port, is placed at the interior rearview mirror assembly, as this is a central location that is readily accessed by a variety of drivers, many of who will be new to the type of rented model, but who will have had previous familiarity with accessing a mirror-mounted IrDA port. This would enable the temporary user of the vehicle access mobile communication and services as well as communication to the rental company if the vehicle breaks down or requires servicing. Certain vehicles could also be equipped with faxes and keyboards for a mobile office capable of sending and receiving information.

In addition to these features, the IrDA port can serve as the interface to systems within the mirror such as a palm-sized keyboard similar to a handheld PDA where the operator can compose, edit, and access systems located in the mirror. This system can be available as an option because, due to the open architecture of the IrDA port, the operator can also interface the system with the existing PDA, phone, or other mobile device capable of composing or editing messages. This provides a useful interface for the operator for entering street addresses and E-mail messages.

In addition, the interior rearview mirror assembly can aid in the interfacing of the mobile communication protocol/needs of a particular brand/model of mobile device (such as, for example, a Palm Pilot™ PDA) to a particular vehicle model of a car manufacturer. For example, the vehicle bus system for a GM vehicle may be different than the architecture for a Ford vehicle. The interior mirror assembly in the respective model/brand of vehicle can function to allow the PalmPilot™, for example, owned by a person to interact with whatever automobile that person carries that PalmPilot™ into, whether a GM vehicle, a Ford vehicle or any other vehicle equipped with a mirror-mounted IrDA-port.

FIG. 1 illustrates an embodiment of the present invention. Mirror-mounted wireless communication system 10 includes a mobile device 11 equipped with a mobile device communication port 12 (preferably an IrDA-port that transmits/receives data via infrared wireless communication). When data is input to mobile device 11 via input element 14 (which may be a keypad or a touch or stylus actuated screen), a communication signal 16 is wirelessly transmitted to mirror-mounted communication device 18 mounted at interior rear-view mirror assembly 20 that is located within the interior cabin of a vehicle (not shown). Preferably, interior mirror assembly 20 is in electronic/data communication with the vehicle electronic system/accessories schematically represented by control 22 in FIG. 1. Control 22 links to vehicle-based telecommunication system 24 that provides a wireless telecommunication link from the vehicle to an external service/information provider.

Also, the mobile device may wirelessly communicate with the vehicle when the driver is approaching the vehicle when parked, such as to provide identity to the vehicle in order to activate/deactivate a security system, an entry system such as door locks, and the like. Also, the mobile device can take part in vehicle-based remote transactions, such as purchases, banking transactions, and the like, such as are described in commonly assigned U.S. Pat. No. 6,158,655, the disclosure of which is hereby incorporated herein by reference. The mobile device, such as a PDA, may include driver license, insurance, registration and similar data that can be displayed to the like of a police officer using a vehicle-based video screen. The vehicle can have built-in codes that authorize use of the vehicle by particular drivers/owners of particular mobile devices.

Figure 2:
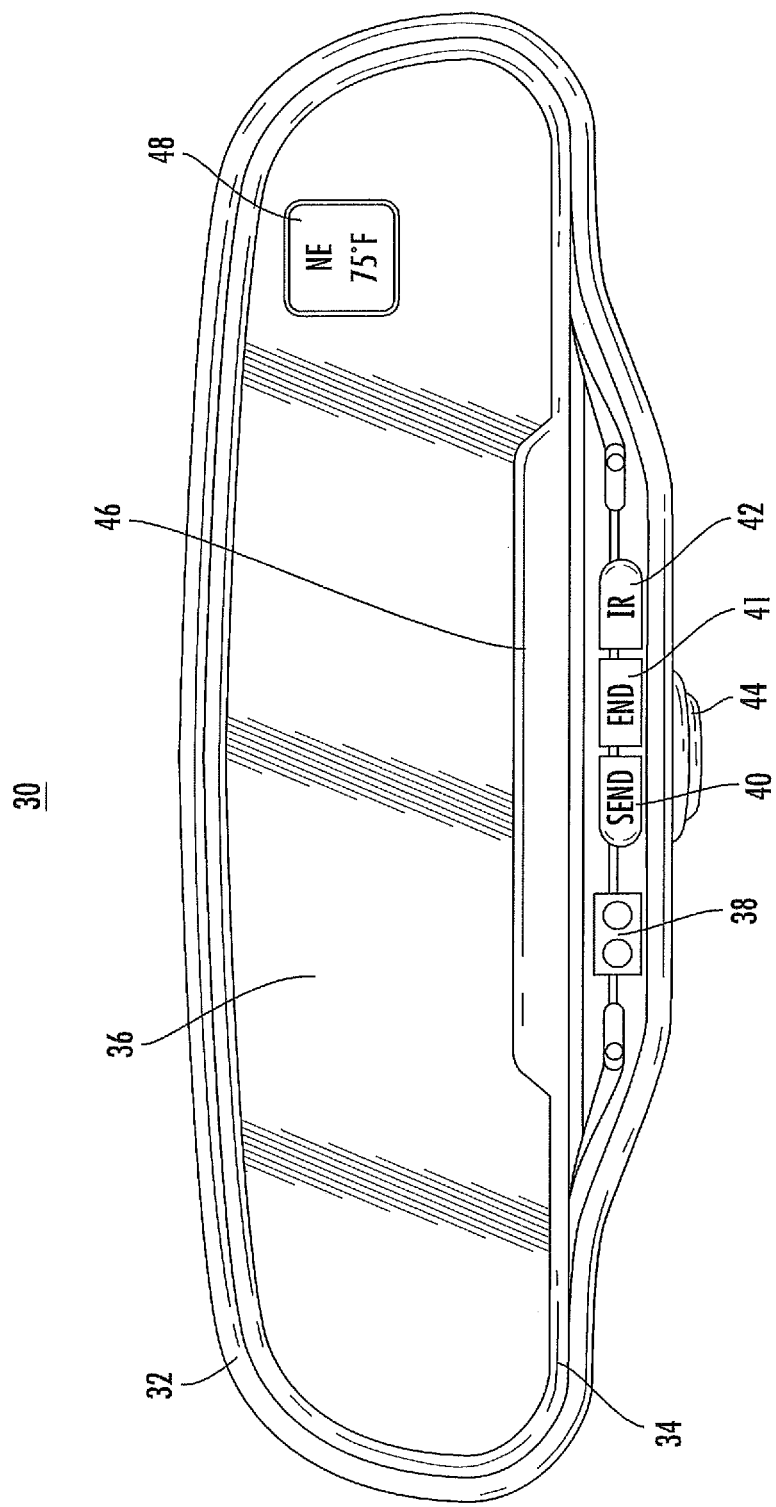
FIG. 2 is a front elevation of an interior rearview mirror assembly, according to the invention.

An interior rearview mirror system 30 incorporating the present invention is shown in FIG. 2. Interior rearview mirror assembly 32 includes a mirror reflector element 36 that is within mirror casing 34. Reflector element 36 may be a prismatic mirror element or an electrically variable reflectance element such as an electro-optic reflective element such as an electrochromic reflective element such as described in commonly assigned U.S. Pat. Nos. 5,140,455; 5,151,816; 5,567,360; 5,525,264; 5,610,756; 5,406,414; 5,253,109; 5,076,673; 5,073,012 or 5,117,346, which are hereby incorporated herein by reference, and in publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Washington (1990), the disclosures of which are hereby incorporated by reference herein in their entireties.

A communication transmitting and/or receiving data port 38 is located in the front, lower bezel portion of casing 34, below mirror reflector element 36. When mirror system 30 is mounted in a vehicle (such as attached to a vehicle windshield or to a vehicle header, as is known in the mirror art), communication port 38 is adapted to receive data from and/or transmit data to a mobile device (such as a PDA or a cellular phone) by wireless data communication. Preferably, communication port 38 comprises an IR data port. Manually operated controls, 40, 41 and 42, facilitate exchange of data between mirror system 30 and a mobile device. Mirror system 30 also includes a multi-text display 46, that preferably comprises a multi-pixel display, more preferably a reconfigurable display and most preferably a display capable of scrolling, such as described in commonly assigned U.S. Pat. No. 6,477,464, which claims priority from U.S. provisional application Ser. No. 60/187,960 filed on Mar. 9, 2000, and U.S. patent application Ser. No. 09/817,874, filed on Mar. 26, 2001, now U.S. Pat. No. 7,224,324, which claims priority from U.S. provisional application Ser. No. 60/192,721, filed on Mar. 27, 2000, the disclosures of which are hereby incorporated herein by reference. Mirror system 30 also includes a display of compass direction and external or interior vehicular temperature.

Also, a mobile device in data communication with mirror system 30 can optionally attach to or dock with the interior mirror assembly, and/or can form a pendant accessory thereto, such as is described in commonly assigned U.S. Pat. No. 6,428,172, the disclosure of which is hereby incorporated herein by reference.

Also, the mobile device can link to a vehicle bus system, such as a CAN or LIN system such as disclosed in commonly assigned U.S. Pat. No. 6,396,408, which claims priority from U.S. provisional patent application Ser. No. 60/196,577, filed on Mar. 31, 2000, the disclosures of which are hereby incorporated herein by reference, via data communication with communication port 38 of mirror system 30.

Figure 3:
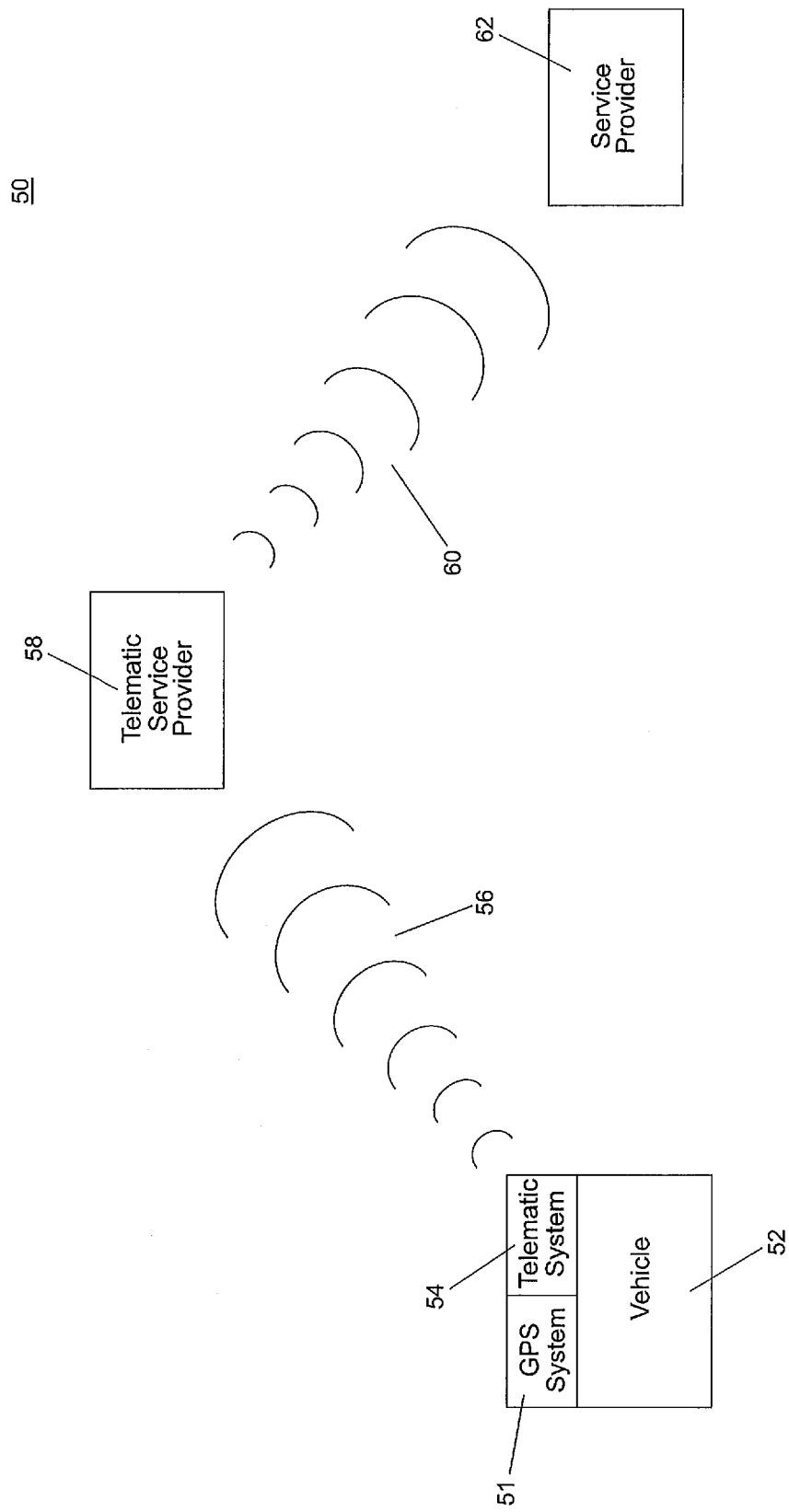
FIG. 3 is an electronic block diagram of a vehicle mirror-based wireless communication system, according to another aspect of the invention.

A vehicular dynamic interactive communication system 50 is shown in FIG. 3. Vehicle 52 includes an in-vehicle GPS system 51 that receives GPS information from a satellite system (not shown) that identifies the geographic location of the vehicle, and its direction while travelling on a highway. This data and other information, such as vehicle type, driver personal information, and the like, is processed by in-vehicle telematic system 54, which communicates via two-way wireless link 56 with a remote telematic service provider 58 (such as an ONSTAR™ system or a dial-in computer server or the like). Telematic service provider 58, upon identifying the location, identity and direction heading of vehicle 52, conveys this data via two-way communication link 60 (also, preferably, a wireless link) to a service provider 62 (such as a gas station, store, cinema, WEB site, toll center, banking center, satellite radio provider, and the like). Service provider 62, upon receipt of input data from vehicle 52 via link 60, provides data/information/service back to vehicle 52 via telematic service provider 58, and preferably with this data/information/service customized to the geographic location and heading of vehicle 52 as generated by GPS system 51.

Also, many mobile devices such as PDAs, cellular phones, and the like, require manual input of data. However, while driving in a car, this may be impractical and/or unsafe for the driver. By linking such mobile devices to a vehicle, as disclosed in the present invention, an in-vehicle voice detection/voice recognition/voice generation system, such as are described in commonly assigned U.S. Pat. No. 6,428,172 and U.S. Pat. No. 6,420,975, the disclosures of which are hereby incorporated herein by reference, can be used to operate the mobile device while traveling in the vehicle. For example, by using an in-vehicle voice detection/recognition/generation system, and by linking a PDA to the vehicle as disclosed in the present invention, the driver can hear data stored in the PDA (such as calendar information, notes and the like) by playback via the vehicle audio system (and with the vehicle voice generation system receiving digital data stored in the PDA via wireless, or less desirably wired, link of the PDA to the vehicle and then converting this digital data to a simulated voice that reads the digital data to the driver via the vehicle audio system). Likewise, the in-vehicle voice detection/recognition/generation system can receive spoken words from the driver, convert these to digital data, and communicate this to the PDA.

The embodiments of the invention in which an exclusive property or privilege is claimed are defined as follows:

1. An automotive communication system for a vehicle, said automotive communication system comprising:
   a global positioning system operable to determine a geographical location;
   a multi-pixel reconfigurable display device disposed at an interior portion of a vehicle equipped with said automotive communication system;
   wherein data is wirelessly communicated to and is received by electronic circuitry of the equipped vehicle and wherein said data is at least in part customized to the geographic location of the equipped vehicle as determined by said global positioning system;

wherein information derived at least in part from said data is displayed by said display device and is viewable by a driver of the equipped vehicle who is operating the equipped vehicle;

wherein a user input for the wireless communication is operable within an interior cabin of the equipped vehicle;

wherein said automotive communication system includes voice input and said automotive communication system includes voice generation; and wherein said data is wirelessly communicated to the equipped vehicle from a data provider located external of and remote from the equipped vehicle.

2. The automotive communication system of claim 1, wherein said data is wirelessly communicated via at least one of a PUSH communication protocol and a PULL communication.

3. The automotive communication system of claim 2, wherein said data provider comprises a telematics provider.

4. The automotive communication system of claim 1, wherein said automotive communication system comprises a link to a vehicle bus system.

5. The automotive communication system of claim 1, wherein said user input comprises at least one of a key input and a touch input.

6. The automotive communication system of claim 1, wherein said automotive communication system comprises a wireless link with a mobile accessory that is a personal accessory of an occupant of the equipped vehicle.

7. The automotive communication system of claim 6, wherein said data is associated with a web site.

8. The automotive communication system of claim 6, wherein said mobile accessory comprises a hand-held telephone.

9. The automotive communication system of claim 1, wherein said display device is disposed in the interior of the equipped vehicle at an interior mirror assembly of the equipped vehicle and wherein said user input is located at said interior mirror assembly.

10. The automotive communication system of claim 1, wherein said automotive communication system comprises a BLUETOOTH protocol and wherein said data is wirelessly communicated via at least one of a PUSH communication protocol and a PULL communication.

11. An automotive communication system for a vehicle, said automotive communication system comprising:
 a global positioning system operable to determine a geographical location;
 a multi-pixel reconfigurable display device disposed at an interior portion of a vehicle equipped with said automotive communication system;
 wherein data is wirelessly communicated to and is received by electronic circuitry of the equipped vehicle and wherein said data is at least in part customized to the geographic location of the equipped vehicle as determined by said global positioning system;
 wherein information derived at least in part from said data is displayed by said display device and is viewable by a driver of the equipped vehicle who is operating the equipped vehicle;
 wherein said automotive communication system includes voice input;
 wherein said data is wirelessly communicated to the equipped vehicle from a data provider located external of and remote from the equipped vehicle;
 wherein said automotive communication system comprises a wireless link with a mobile accessory that is a personal accessory of an occupant of the equipped vehicle;
 wherein said mobile accessory comprises a hand-held telephone; and
 wherein said data is associated with a web site.

12. The automotive communication system of claim 11, wherein said user input comprises a touch input.

13. The automotive communication system of claim 12, wherein said automotive communication system comprises a BLUETOOTH protocol.

14. The automotive communication system of claim 13, wherein said automotive communication system includes voice generation.

15. The automotive communication system of claim 14, wherein a user input for the wireless communication is operable within an interior cabin of the equipped vehicle.

16. An automotive communication system for a vehicle, said automotive communication system comprising:
 a global positioning system operable to determine a geographical location;
 a multi-pixel reconfigurable display device disposed at an interior portion of a vehicle equipped with said automotive communication system;
 wherein data is wirelessly communicated to and is received by electronic circuitry of the equipped vehicle and wherein said data is at least in part customized to the geographic location of the equipped vehicle as determined by said global positioning system;
 wherein information derived at least in part from said data is displayed by said display device and is viewable by a driver of the equipped vehicle who is operating the equipped vehicle;
 wherein said automotive communication system includes voice input;
 wherein said data is wirelessly communicated to the equipped vehicle from a data provider located external of and remote from the equipped vehicle;
 wherein said automotive communication system comprises a wireless link with a mobile accessory that is a personal accessory of an occupant of the equipped vehicle;
 wherein said data provider comprises a telematics provider; and
 wherein said data is associated with at least one of a gas station, a store, a cinema, and a web site.

17. The automotive communication system of claim 16, wherein said mobile accessory comprises a hand-held telephone.

18. The automotive communication system of claim 17, wherein said automotive communication system comprises a BLUETOOTH protocol.

19. The automotive communication system of claim 18, wherein said automotive communication system includes voice generation.

20. The automotive communication system of claim 17, wherein a user input for the wireless communication is operable within an interior cabin of the equipped vehicle and wherein said data is wirelessly communicated via at least one of a PUSH communication protocol and a PULL communication.

* * * * *